Oct. 13, 1942.  W. M. CLARK  2,298,278
NOVEL FOOD PRODUCT AND METHOD OF PRODUCING THE SAME
Filed Oct. 5, 1939
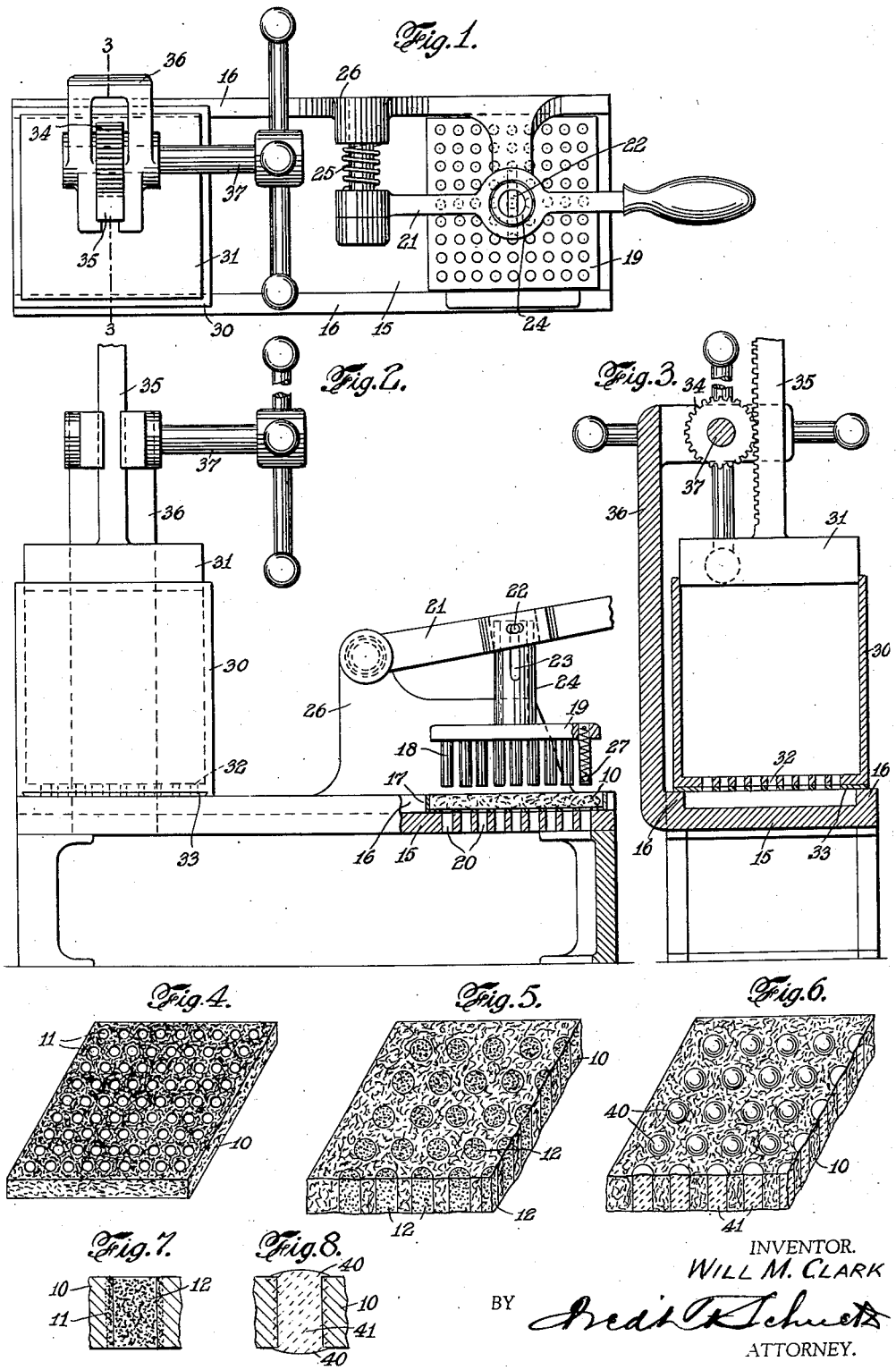
INVENTOR.
WILL M. CLARK
BY
ATTORNEY.

Patented Oct. 13, 1942

2,298,278

UNITED STATES PATENT OFFICE 2,298,278

NOVEL FOOD PRODUCT AND METHOD OF PRODUCING THE SAME

Will M. Clark, South Orange, N. J.

Application October 5, 1939, Serial No. 298,007

7 Claims. (Cl. 99—86)

The invention relates to an article of food produced from farinaceous material as flour obtained from wheat or other cereal baked into a bread loaf, cake loaf, or like article; and it is concerned more especially with slices or portions cut therefrom.

It has for an object to so alter the physical structure of the mass that it may readily be impregnated with a pasty or plastic edible filler material to enhance the gustotory properties or tastiness of the base, and to allow of toasting not only the exposed surfaces of said base but a substantial amount of the filler as well. Thus, the prepared base may serve as a vehicle for the introduction of one or more ingredients in tasty form as a valuable nutritious food item.

This is effected by perforating, preferably transversely, the slices or portions of the bread or like material to an extent insufficient to destroy the rigidity of the mass, as by removing cores of the requisite diameter for proper proportion and replacing the same with the filler material such as cheese, ground ham, beef, peanut butter, jelly, various spreads and prepared condiments, etc., which may be inserted under pressure or by spreading into the voids. It will be appreciated that the perforated slices may be prepared rapidly at the time of use or in advance and filled only immediately prior to consumption; also, and especially in the case of a cheese or like filler, the filled base may be subjected to toasting which will impart over a large portion of the base the flavor of toasted cheese. In the usual toasted cheese sandwich as heretofore prepared, the flavor is present merely about the edges of a sandwich when some of the intermediate slice of cheese protrudes; and after the first outside bite, no further taste of the grilled cheese is had.

Furthermore, with the novel sandwich when it comes from the toaster or grilling apparatus, there is no flow of melted cheese or the like as the exposed opposite surfaces of the fillings have been seared to seal in the semi-fluid cheese in the individual perforations. The sandwich may, therefore, be handled without soiling one's hands, precluding the use of knife and fork in serving under "quick service" conditions. In addition, the novel sandwich presents a very attractive article of food.

It has for another object the making of the item with only one slice of the base, cut the required thickness, making it compact; and, in the case of cheese filler, to seal in the cheese so that it does not run out to foul the toaster.

Another object is to enable one to prepare the item in a combination of two or more slices of suitable thickness by assembling them, after being impregnated with various fillers, with other items of food such as lettuce, ham, spreads, etc., between the slices, producing the whole in form of "double-" or "triple-deck" sandwiches or "club" type.

A still further object of this food item is to make it possible in the different forms or combinations to work out various combinations of vitamin and caloric content to fit into dietary needs and to make the perforated vehicle a receptacle for concentrated food products and special formulae.

The novel sandwich may be readily produced by machine making it an item available for toasting or serving in a few seconds, which is very much desired by the "quick service" types of food outlets, schools, and delicatessen stores where sandwiches of the ordinary type are prepared for home consumption.

I am aware that it has been proposed heretofore to provide a baked article of food or biscuit along the idea of the original "Waffle" with perforations or indentations, but in this instance the texture is not maintained throughout the body of the material due to the presence of the prehardened or crusted walls of the perforations, so that the natural state of the material is altered, making it impossible to impregnate the structure of base thoroughly with filler material on account of the glazed surface of its walls. The same not only provides practically a barrier to the penetration of any filler material to prevent any substantial impregnation of the base material but the walls have a tendency to cause any filler material to slide away or become detached therefrom as it cannot adhere to the glazed surface. Moreover, the relative proportion of the hardened or crusted matter to the body of the bread or the like makes the article of an entirely different character from that desired, viz.: bread or the like in its normal state and impregnated with a desired filler, the whole being capable of being toasted on the upper and lower surfaces. With the known type of the perforated or indented material, any further toasting would render the already glazed and crusted walls too brittle or would cause burning thereof, or at least effect an undesirable overgrilling of the bread material; whereas by subjecting the filler material to the toasting or grilling operation, applicant is enabled to cause the opposite exposed surfaces to be properly toasted; and, in the case of the fillings such as cheese and the like, to sear the same sufficiently to provide a holding crust thereof to retain the individual fillings in their respective perforations, even though melted and penetrating the intermediate wall portions.

In carrying out the invention, provision is made for a plurality of through channels or perforations in a slice of bread, cake, or like baked farinaceous product, the channels being located more or less adjacently one another while retaining the texture of the base material uniform throughout the intermediate walls which are of substantial thickness. Into the voids thus provided is arranged to be introduced the filler material; and when desired, and depending upon the nature of the filler, the filled perforated slice may be toasted to sear the opposite exposed surfaces of the filler plugs to more positively insure their retention in position in a channel, the filler material also spreading, by capillary attraction and pressure, into the intermediate wall portions to more or less thoroughly permeate the entire mass of the base material.

It will be understood, of course, that a plurality of individual slices thus prepared may be arranged together in any desired manner and/or combined with other items of food.

The nature of the invention, however, will best be understood when described in connection with the accompanying drawing, in which:

Fig. 1 is a plan view of a simple mechanism which may be used in perforating or otherwise providing the channels in a slice of bread or the like and also for the introduction of the filler material into the voids thereof.

Fig. 2 is a front elevation of the mechanism with a portion shown in vertical section.

Fig. 3 is a transverse vertical section taken on the line 3—3, Fig. 1 of the drawing.

Fig. 4 is a perspective view of a slice of bread provided with channels and constitutes the first stage in the preparation of the novel food product.

Figs. 5 and 6 are similar and fragmentary views illustrating on an enlarged scale different stages in the production of the novel food product.

Figs. 7 and 8 are fragmentary sectional views, on an enlarged scale, illustrating respectively filler material introduced into a channel, and the same seared upon its exposed surfaces.

Referring to the drawing, more particularly Figs. 4-8, inclusive, 10 designates the baked farinaceous product of substantially uniform texture throughout, such, for example, as a slice of bread, cake or the like; and the same, in accordance with the invention, is provided with a multiplicity of through channels or openings 11 extending transversely through the slice. These openings or channels in the material may conveniently be provided and of the desired size by a suitable perforator mechanism, for example, of the nature illustrated in Figs. 1-3, inclusive.

As shown, this mechanism embodies a table or bed plate 15 suitably supported and in the nature of an open-ended channel through the provision of low lateral upstanding walls 16. In this channel is adapted to slide a carrier 17 with perforated bottom and shaped to conform to the desired shape of the slice, in the present instance rectangular, and designed to receive a slice 10 of the material to be perforated. In the particular embodiment illustrated, this is effected by means of a gang of pins or tubular members 18 extending downwardly from a head or carrier 19 and adapted to register with perforations 20 provided at one end of the base plate to punch out material.

Provision is made to lower the head 19 with punches 18 toward the slice 10, the punches passing through the slice and the cooperating perforations 20 to remove material from the slice and afford thereby a plurality of the adjacently disposed perforations 11 therein. Thus, a lever 21 is provided to depress the perforating unit vertically through connection therewith by a pin 22 operating in a slot 23 of an upward extension 24 of the head. In order always to return the perforating unit to an inactive position, a spring 25 is arranged to act against the lever in a direction to reposition the same, said spring being mounted in an upstanding bracket 26 providing also bearings for the rock shaft end of the lever. The punches for convenience in clearing and ejecting the pellets of removed material may be in the nature of a tubular member in which operates a spring-pressed ejection plunger 27.

After a slice has thus been provided with the perforations or channels through the same, these voids are designed to be filled either immediately or just prior to use with the desired filler material 12, as indicated in Figs. 5 and 7. This may be accomplished on the same mechanism whereby the perforations of a slice have been effected, the carrier 17 with retained and perforated slice 10 being moved along the surface of the table 15 in the guide channel to the opposite end of the said table for positioning beneath an impregnating unit. This may consist of a suitable container 30 in which is adapted to reciprocate a plunger 31 to express therefrom through bottom perforations 32 the particular material with which it is desired to fill the voids or perforations previously provided by the device. To this end, the carrier 17 is so gauged that the perforations 11 of a slice will register with the perforations 32 as well as with further perforations provided in an intermediate cut-off plate 33 slidably carried by and mounted at the bottom of the container 30.

By exerting pressure upon plunger 31, the material will be extruded from the container through the respective perforations and into the registering channels 11 of the slice to not only fill the same but also to cause the material 12 to permeate more or less the intermediate walls, as indicated more particularly in Fig. 7 of the drawing. The required pressure may be secured, for example, from a manually rotatable spur gear 34 which engages a rack 35 extending upwardly from the top of the plunger 31 and guided in a yoke 36 which provides also bearings for the operating shaft 37 of the spur gear. After the perforations have been properly filled, the pressure is released on the plunger and the cut-off plate 33 is given a lateral movement, whereupon the carrier 17 is moved from beneath the container 30 to expose the slice which is then ready for use.

In many instances, it may be desired also to toast such slice together with material filling the perforations, this in the case of certain materials having the further advantage of searing the exposed outer surfaces to provide more or less retaining heads 40 of the material 41, Fig. 8 of the drawing, which will assist in retaining in the perforations material of a more or less liquid nature.

I claim:

1. The method of preparing an article of food, which comprises providing holes distributed throughout approximately the entire body of a previously baked farinaceous product with intermediate walls of substantial thickness relatively to the diameter of the holes, inserting therein a plastic edible material, and sealing in said material.

2. The method of preparing an article of food, which comprises providing holes distributed throughout approximately the entire body of a previously baked farinaceous product with intermediate walls of substantial thickness relatively to the diameter of the holes, inserting therein a plastic edible material, and then toasting the exposed surfaces of the product.

3. The method of preparing an article of food, which comprises providing holes distributed throughout approximately the entire body of a previously baked farinaceous product with intermediate walls of substantial thickness relatively to the diameter of the holes, inserting therein under a substantial pressure a plastic edible material, and sealing in said material.

4. The method of preparing an article of food, which comprises slicing bread and providing holes throughout approximately the entire body with intermediate walls of substantial thickness relatively to the diameter of the holes, inserting therein cheese, and then toasting the exposed surfaces of the bread and the cheese.

5. As an article of food, a slice of a pre-baked farinaceous product of substantially uniform texture throughout and affording voids and having a multiplicity of portions removed therefrom to provide holes distributed throughout approximately the entire body of the product with intermediate porous walls of substantial thickness relatively to the diameter of the holes and exposing voids, together with a plastic edible material filling said holes and seared over its exposed surfaces to be sealed therein, said material penetrating the exposed voids of the intermediate walls to be further retained thereby against displacement.

6. As an article of food, a slice of a pre-baked farinaceous product of substantially uniform texture throughout and affording voids and having a multiplicity of portions removed therefrom to provide through channels distributed throughout approximately the entire body of the product with intermediate porous walls of substantial thickness relatively to the diameter of the channels and exposing voids, together with a plastic edible material filling said channels, penetrating the exposed voids of the intermediate walls to be retained thereby against displacement, and toasted, together with the farinaceous product, over the exposed surfaces thereby to seal said material in the channels.

7. As an article of food, a slice of bread perforated transversely to provide holes distributed throughout approximately the entire body of the product with intermediate porous walls of substantial thickness relatively to the diameter of the holes and exposing voids, together with cheese filling said holes, and toasted over its exposed surfaces thereby to seal the cheese therein, said cheese penetrating the exposed voids of the intermediate walls to be further retained thereby against displacement.

WILL M. CLARK.